United States Patent
Rumph et al.

(10) Patent No.: US 6,844,942 B2
(45) Date of Patent: Jan. 18, 2005

(54) METHOD FOR TRAPPING RASTER DATA IN A RUN-LENGTH ENCODED FORM

(75) Inventors: David E. Rumph, Pasadena, CA (US); Jon S. McElvain, Redondo Beach, CA (US); Jared Boone, Loveland, OH (US)

(73) Assignee: Xerox Corporation, Stamford, CT (US)

( * ) Notice: Subject to any disclaimer, the term of this patent is extended or adjusted under 35 U.S.C. 154(b) by 316 days.

(21) Appl. No.: 10/263,534

(22) Filed: Oct. 2, 2002

(65) Prior Publication Data

US 2003/0025945 A1 Feb. 6, 2003

Related U.S. Application Data

(63) Continuation of application No. 09/409,541, filed on Sep. 29, 1999, now abandoned.

(51) Int. Cl.[7] .............................................. G06F 15/00
(52) U.S. Cl. ..................... 358/1.9; 358/1.15; 358/518; 382/167
(58) Field of Search ......................... 358/1.1, 1.9, 443, 358/448, 462, 518, 521, 525, 539; 382/167, 226, 266, 162, 164, 165, 166, 245

(56) References Cited

U.S. PATENT DOCUMENTS

| | | | | |
|---|---|---|---|---|
| 5,613,046 A | | 3/1997 | Dermer ...................... 358/1.9 |
| 5,666,543 A | | 9/1997 | Gartland ..................... 395/788 |
| 5,668,931 A | | 9/1997 | Dermer ...................... 358/1.4 |
| 5,864,651 A | * | 1/1999 | Lavie et al. ................ 358/1.15 |
| 6,023,558 A | * | 2/2000 | Grabowski .................. 358/1.9 |
| 6,345,117 B2 | | 2/2002 | Klassen ...................... 382/167 |
| 2002/0051156 A1 | | 5/2002 | Weinholz et al. ............ 358/1.9 |

OTHER PUBLICATIONS

U.S. Appl. No. 09/409,541, filed Sep. 29, 1999, David E. Rumph.

* cited by examiner

Primary Examiner—Mark Wallerson (57) ABSTRACT

A method of correction for toner misregistration in color printing systems, specifically for run length encoded image data. This method, called "trapping", usually involves extending the color separations one or more pixels to overlay the edge. The color of the "trap zone" is chosen such that it is nearly imperceptible in the presence of the two initial colors. Our approach assumes the existence of a "trap generator", which provides a trap color given two input colors.

In run length encoded image format, the image is comprised of an array of "scanlines", consisting of a string of "runs" that are specified by a minimum position in the fast (horizontal) direction, a length, and a color. We describe a method of trapping involving the following steps: 1) inspecting the run lengths in each scanline to determine the color edges of the image; 2) sending the colors at the boundaries to the trap generator to determine the trap color; and 3) modifying the intersecting runs with the trap color. The result is an efficient elimination of the edge defects at color boundaries, which is enabled by the run length encoded image format.

5 Claims, 10 Drawing Sheets

POTENTIAL TRAP REGIONS

POTENTIAL TRAP REGIONS

FIG. 4

TRAP REGION

SUB-RUN SEGMENT

TRAPPED RUN

FIG. 16

TRAPPED RUN

SUBDIVIDED SWEEP RUNS

FIG. 22

INTERPOLATED SWEEP RUNS

FIG. 23

METHOD FOR TRAPPING RASTER DATA IN A RUN-LENGTH ENCODED FORM

CROSS REFERENCE TO RELATED APPLICATION

This is a continuation of U.S. application Ser. No. 09/409,541 filed Sep. 29, 1999, abandoned the contents of which are incorporated herein by reference.

BACKGROUND OF THE INVENTION

A method of deciding where to do trapping of color image data while the data is in run length encoded form by determining if there is a color edge between pixels on the current or adjacent scan lines, and invoking the trap generator if there is.

If there is even a small amount of misregistration between the printer separations (typically cyan, magenta, yellow, and black in a color printer), regions of high color contrast will show either a dark band or a white fringe, depending on the direction of the color misregistrations. These unwanted dark bands will be particularly visible in the presence of light colors; conversely, the white fringe will be particularly noticeable in the presence of dark colors.

The method of correcting for these misregistration zones, called "trapping", usually involves extending the color separations one or more pixels to overlay the edge. The color of the "trap zone" is chosen such that it is nearly imperceptible in the presence of the two initial colors when viewed from afar. The result is an insignificant loss of detail and an elimination of the edge defect.

Trapping is a two step process. The first step is to locate the edge, and the second is to generate the overlay of one or more pixels, in any combination of the color separations.

The second step is done by a "trapping generator". The two inputs for the trapping generator are the colors on both sides of the edge in question. As an example, consider magenta and cyan, with a user-specified maximum trap width of two. The generator will compute from these whether trapping is necessary, what color to use, and where it should be applied. In our example, the correction could be zero (no trapping), one, or two pixels in width, and could be any combination of cyan, magenta, yellow and black, and could be located in either the magenta or cyan area. Various forms of trapping generators are described in U.S. patent application Ser. Nos. 09/176 969, 09/176 970 and 09/177 276, and are incorporated herein by reference.

The first step in the trapping process is to determine where there is an edge on which to apply trapping. Trapping is typically used between pixels that are not of identical color, but it can be used in other locations as well. In addition, it is typically applied to decompressed image data (pixel encoded) but it would be convenient if it could be applied to image data that is still in run length encoded form. The invention described below is such a method.

SUMMARY OF THE INVENTION

This system requires a user specification of the maximum trap radius; i.e., the maximum number of pixels over which the trap zone will extend. It also requires a "scanline buffer" that has twice the number of scan lines as the trap radius specified. Each scanline of the image consists of a string of "runs", which are specified by a minimum position in the fast (horizontal) direction, a length, a color (if it is constant color), and other tags used for printing purposes. The runs can be of constant color, or derived from sampled image data. In this example, the trap radius is two, so four scanlines at a time will be examined during the trapping procedure. First, the runs of all four scanlines are inspected, and the point where any run ends on a particular scanline is assumed to be an edge (denoted a "segment boundary").

In order to determine what traps are needed on the fast- and slow-scan edges, and adjacent corners, the four colors adjacent to the center "crosshairs" of the buffer at each segment boundary are inspected. The center crosshairs are comprised of the segment boundary in the fast-scan direction between the two segments, and the scanline boundary between the center two scanlines of the buffer. There are four segments adjacent to these crosshairs. We call them "upper left", "upper right", "lower left" and "lower right" corners. More than one of these may have the same color. In order to determine where traps, if any, need to be placed, the four corners are compared, yielding one of 13 possible geometries. The geometry determines where traps might be needed, directing the software to specific code that handles each geometry case. In each of these thirteen cases, the colors are used as inputs to the trapping generator, and depending on the output of the trapping generator, the colors of all four runs within the crosshairs may be modified.

Once all segment boundaries within the scanline buffer are processed, the topmost scanline is output (to the printer, for example), and a new scanline is read into the bottom of the buffer. The trapping procedure is then repeated for this new set of scanlines within the buffer, until the entire image is processed.

DETAILED DESCRIPTION OF THE INVENTION

There are three areas of image manipulation involving trapping: rules for deciding the conditions under which to trap, finding color pairs in a "display list" representation of a collection of graphical objects, and finding situations to trap in an uncompressed raster representation of the page.

It is assumed that there is a trap generator that, given a pair of colors, returns 1) whether trapping is needed or not, 2) what color the trap should be, and 3) where the trap should be located relative to the edge.

The following discussion concerns an intermediate between the second and third situations above, where the graphical data is still in run-length encoded form. Edges are easy to find in the fast-scan direction, since runs end there. In the slow scan direction, more effort is needed because runs on adjacent scanlines must be individually tested to see if they are the same or different. Complicating matters is that runs on adjacent scanlines often begin and end in different places. A third complication is how to identify and deal with corners. The final difficulty is how to add traps to a run-length encoded data form with minimal overhead. This embodiment uses buffered runs divided into "segments" of uniform overlap, and constructs a "geometry" that can be used to control the application of traps.

Figure 1:
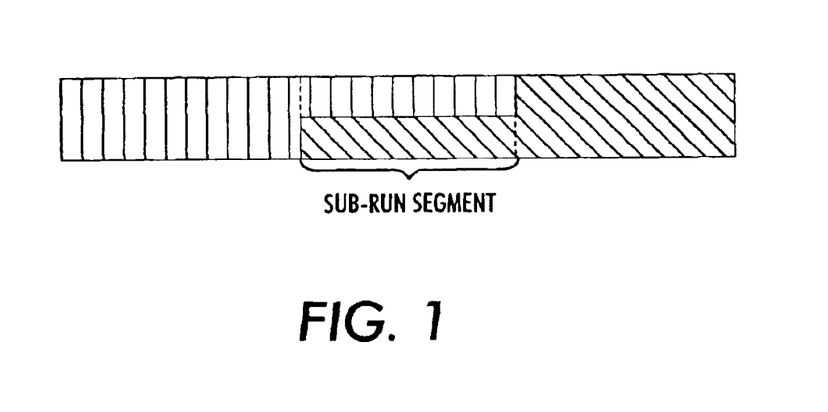
FIG. 1 shows a segment of overlap between two runs.

To address the issue that runs may not begin or end in the same places on abutting scanlines, the runs are divided into segments at the point where at least one run on a sufficiently nearby scanline ends. FIG. 1 shows a segment of overlap between two runs.

Figure 2:
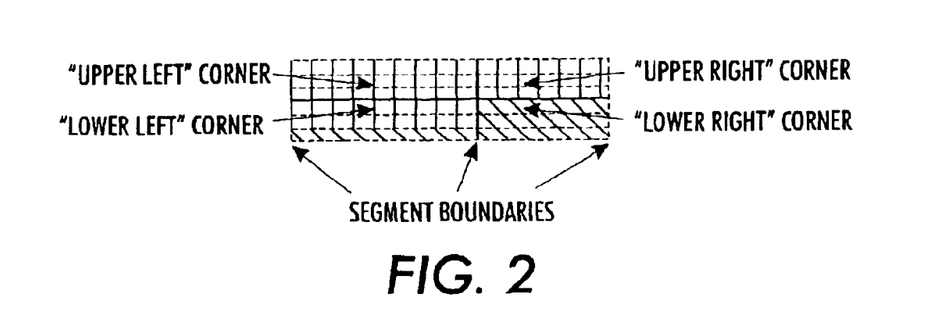
FIG. 2 is a region of interest for trapping runs, with intersections and four relevant corner run segments.

The trap size (width) is often greater than one pixel. In the fast-scan direction, a trap of width x is easily applied by chopping off a total of x pixels of the run(s) adjacent to the edge, depending on where the trap generator said to place the trap. In the slow-scan direction, multiple scanlines of runs are maintained to form the prospective trap region. In order to accommodate all possible trap positionings, a buffer of at least 2x scan lines is needed. At least two run segments are needed to apply any fast-scan traps. In order to determine what traps are needed on the fast and slow scan edges, and adjacent corners, the four colors adjacent to the center of the intersection of the buffer must be looked at. The center intersection is comprised of the segment boundary in the fast-scan direction between the two segments, and the scanline boundary between the center two scanlines of the buffer. FIG. 2 shows a region of interest for trapping runs, with the central intersection and four relevant corner run segments.

Figure 3:
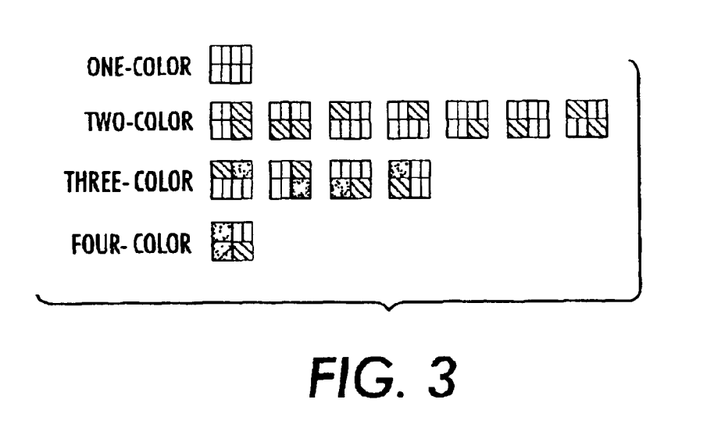
FIG. 3 shows the 13 possible corner geometries.

There are four segments adjacent to these intersections which can be referred to as "upper left", "upper right", "lower left", and "lower right" corners. More than one of these may have the same color. In order to determine where traps, if any, are needed, the four corners are compared, yielding one of 13 possible geometries. The geometry determines where traps might be needed, directing the software to specific code that handles each geometry case. FIG. 3 shows all of the possible geometries for the segment boundary inspection procedure.

Figure 4:
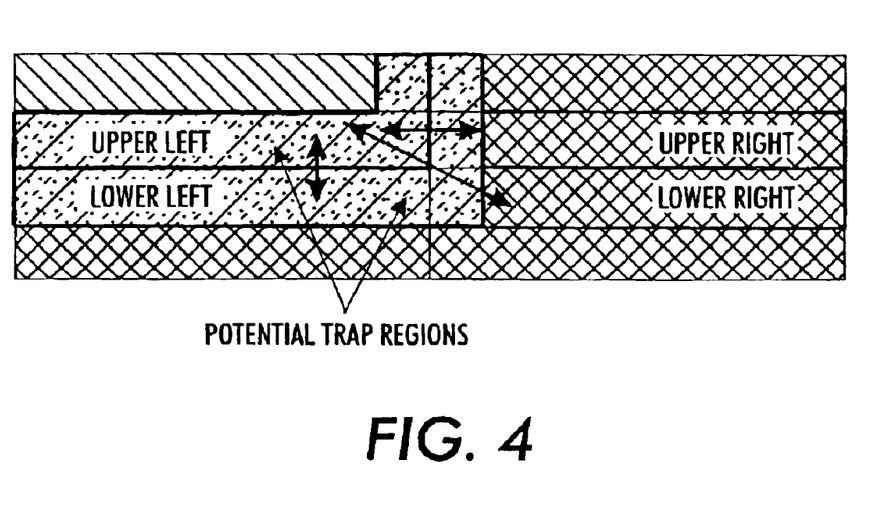
FIG. 4 shows the interactions of concern for geometry-based trapping.

As trap processing proceeds across the fast-scan runs and the slow-scan scanlines, each segment eventually becomes the upper left corner of the intersection. This is ensured even when the segment is the last on a scanline by providing a "dummy" run of the same color beyond the end of the scanline. Taking advantage of this characteristic avoids redundant work in later processing; it is therefore only necessary to check the interaction between the upper left corner and the other three corners. Even so, traps may only be required in the upper left corner, or in the lower left, upper right and lower right corners; or they may be required in all four corners, as in the case of centerline traps. FIG. 4 shows the interactions of concern for quadrant-based trapping.

Trapping data is treated by creating two separate scanline buffers, one for the original input scanlines, and the other for the modified scanlines that are to be sent as output (to the printer, for example). The output buffer is initially a copy of the input scanline buffer. When it is determined that a trap is needed, each run to be trapped is subjected to the following procedure: 1) a new run is created; 2) the original run's data is copied to the new run; 3) the lengths of the original, now shortened, run and the new run are adjusted appropriately; and 4) the trap color and rendering intent are applied to either the original or new run, depending upon the specific printing requirements.

A run may be affected by more than one trapping operation, and so may be updated more than once. Keeping a "modified" flag in the output run structure makes it possible to treat this as a special case to optimize performance and quality. If a particular run is to be trapped that has already been modified, the existing color of the run is combined with the color that is returned by the current call to the trap generator. This color combination can be in the form of color separation averaging, or taking the maximum (or minimum) value of the two colors.

In the fast scan direction, only the upper left and upper right run segments on the scanline immediately above the horizontal intersection need be updated with traps. However, in the slow-scan direction, run segments farther away from the intersection may need to be altered, depending on the width of the trap and the offset position relative to the intersection. For this reason, the number of scanlines that need to be buffered is two times the maximum trap width in the slow-scan direction. The maximum trap width need not be the same in the slow and fast scan directions.

The trapping procedure is repeated for all segment boundaries detected within the input scanline buffer. Once all boundaries have been processed, the topmost scanline of the output buffer can be output. The remaining lower scanlines in the buffers are rolled up one position (vertically), and a new scanline is read into the lowest position of both buffers. Once again, there will be 2x scanlines in the buffers, where x is the trap radius. The trapping procedure is repeated, and new scanlines output/read, until all image data is processed.

An additional method is needed for efficiently trapping color gradations (sweeps) in a run length encoded form. As discussed above, processing in run-length encoded form eliminates considerable work when applying algorithms such as trapping that deal with edges of objects, provided the objects have constant color. Run-length data description is of no value, however, in the general case where the pixel data is inherently sampled, such as a scanned image, and the object edge runs along the scanline boundary. The following describes a method for trapping the edge of a sampled image where it is known that the colors along the edge are varying slowly, as is the case with a sweep.

Here again, the following assumes a trap generator that, given a pair of colors, returns 1) whether trapping is needed, 2) what color the trap should be, and 3) where the trap should be located relative to the edge. The following assumes a run-length encoded form of raster data. Runs can be of constant color, wherein all the pixels of a run have the same color, or of sampled color, wherein each pixel of the run has a different color, as specified by a referenced pixel map. Determining what to do in the fast scan direction is easy because the edge is easily located at the run boundary. In the slow-scan direction, abutting constant color runs can be relatively easily compared over the sub-runs ("segments") in which they overlap.

Figure 5:
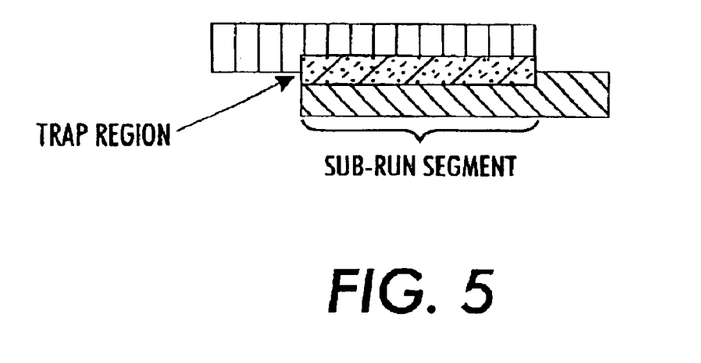
FIG. 5 shows the trapping of a segment of overlap between two constant color runs.

In the general case of abutting runs, at least one of which is sampled color, no correlation between adjacent pixels of a single sampled color run can be assumed, and the trap generator must be separately consulted and the trap applied for each pixel across the segment that overlaps. FIG. 5 shows the trapping of a segment of overlap between a constant color and a generic sampled run. Each sampled color pixel in the trap region must be individually trapped against the constant color.

The following discusses sampled color runs where it is known that the adjacent pixels of a sampled color run are correlated, for example, in the case where the sampled color pixels represent a smoothly shaded gradient, or sweep.

Figure 6:
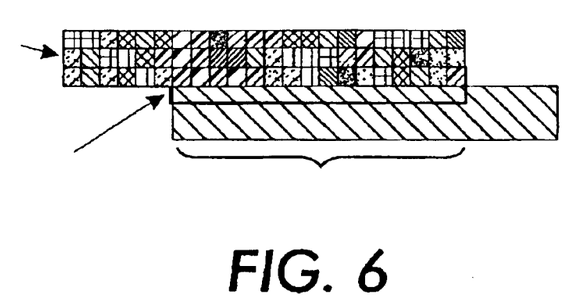
FIG. 6 shows the trapping of a segment of overlap between a constant color and a generic sampled color run.
Figure 7:
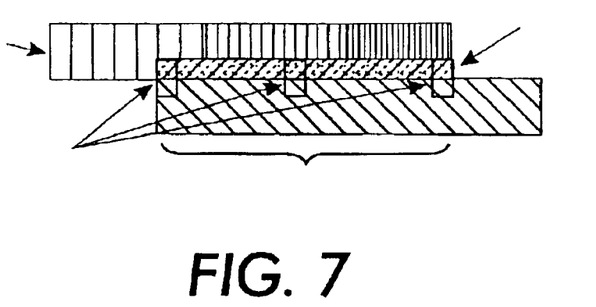
FIG. 7 shows the trapping of a segment of overlap between a constant color and a sampled color run of gradation. Interpolation can occur within areas of similar trap parameters.

This method looks at the two ends and the center of the two run segments across an edge from each other, at least one of which is sampled color data known to be smoothly varying. FIG. 6 shows the trapping of a segment of overlap between a constant color and a sampled color run of gradation. For each of the three color pairs, the trap generator is consulted, resulting in a trap color and trap offset for each pair. If the trap offset matches for each of the three color pairs, interpolation can be used to determine the trap color for all the other pixels of the edge. FIG. 7 shows the trapping of a segment of overlap between a constant color and a sampled color run of gradation.

Figure 8:
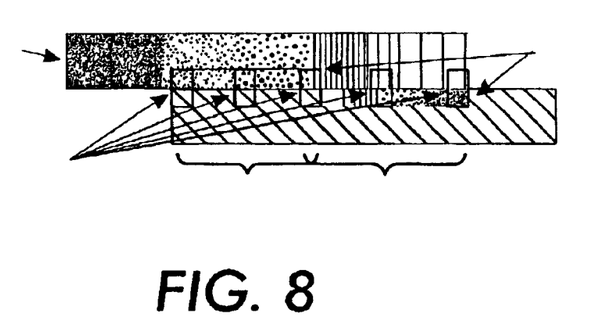
FIG. 8 shows the trapping of a segment of overlap between a constant color and a sampled color run of gradation. Repeated dividing yields subsegments within which interpolation can occur.

If any of the trap offsets differ among the three pairs, the run of sampled color is divided in half, forming two sub-runs. The previous center pixel pair becomes the new end of each half. For each half, the process is repeated with a new center pixel pair. Note that the trap generator parameter information is already known for the two ends; the trap generator needs to be consulted only for the new center pixel pair. Each sub-run is divided until the trap offsets all match for all three points in the sub-run. The trap color for that sub-run is then calculated by interpolating the trap color from one end to the other. FIG. 8 shows the trapping of a segment of overlap between a constant color and a sampled color run of gradation. Eventually, if the parameters continue not to match for some sub-run as it is continually divided, the sub-run's length will reach three pixels or less; at that point all the necessary trap colors are already known, so that no interpolation is necessary.

EXAMPLES

Example 1

Figure 9:
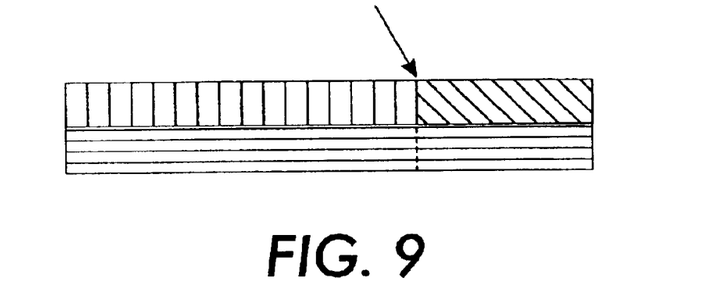
FIG. 9 shows the scanline buffer configuration for Example 1, where the trap radius is set to unity.

We consider the case where the user specifies a trap radius of 1. Run-length encoded data consisting of constant color runs is sent to the trapping module for misregistration corrections. Since the trap radius is one, the input and output scanline buffers will collect two scanlines each. The set of scanlines under consideration in the scanline buffers is shown schematically in FIG. 9.

Figure 10:
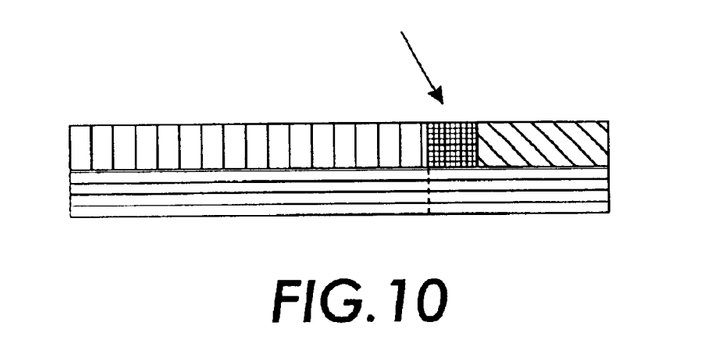
FIG. 10 shows the modification of the upper right run resulting from trapping in the fast direction.

Inspection of the input scanline buffer reveals that segment boundary appears on the topmost scanline, at the intersection between the red and green runs. The geometry will be determined by the run colors that appear at this segment boundary: upper left=red, upper right=green, lower left=blue, lower right=blue. The geometry for this example would be a split-upper, one of the 13 specified geometries from FIG. 3. Since the upper left and the upper right colors are different, the trap generator will be consulted. In this example, it is assumed the color returned by the trap generator is a brownish-green tint, and the trap is to be placed on the right side of the run boundary (FIG. 10). For this case, the upper right (green) run will be modified, such that it will begin one pixel further to the right of the segment boundary. A new run of constant color (length one pixel) will be inserted to the right of the segment boundary, and will carry the color returned by the trap generator.

Figure 11:
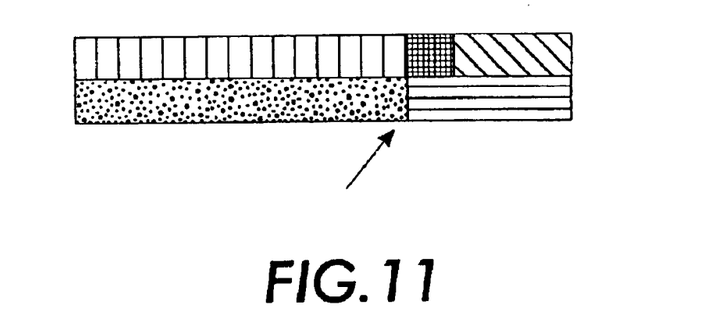
FIG. 11 shows the modification of the lower left and upper right runs resulting from trapping in both the fast and slow directions. At this point the topmost scanline is emitted.

The trap generator will then be consulted for upper left (red) and the lower left (blue) pixels of the segment boundary, since these colors are also different. In this example, the trap generator is assumed to return a medium gray trap color, with trapping to occur only on the lower left run. The lower left run will then be split at the segment boundary into two separate runs, as shown in FIG. 11. The color of the left portion of the divided run will be set to the medium gray color returned by the second call to the trap generator.

Figure 12A:
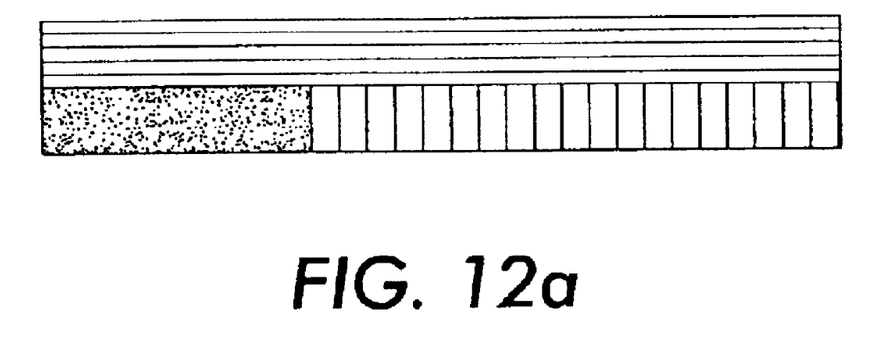
FIGS. 12a and 12b show the input and output scanline buffers, respectively after a new scanline is read.
Figure 12B:
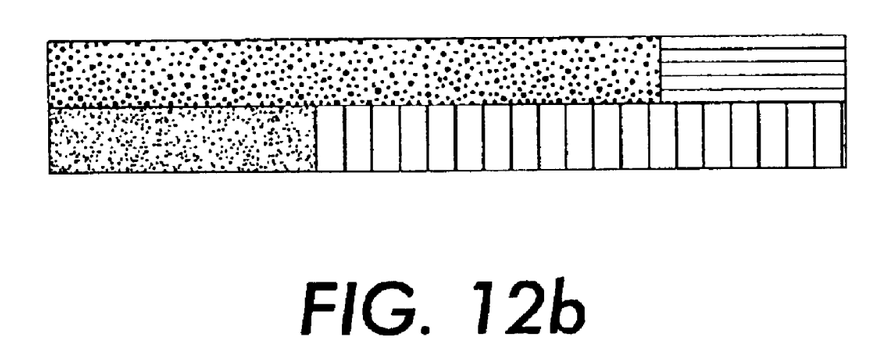

Since all segment boundaries of the scanline buffer have been analyzed, the topmost scanline is emitted (for example to the printer). The previous bottom scanline becomes the new top scanline, and the next scanline is read in for analysis, as shown in FIG. 12. The new segment boundaries are located for the scanline buffer, and the runs are trapped accordingly. This process is repeated until all scanlines of the image have been analyzed.

Example 2

Figure 13:
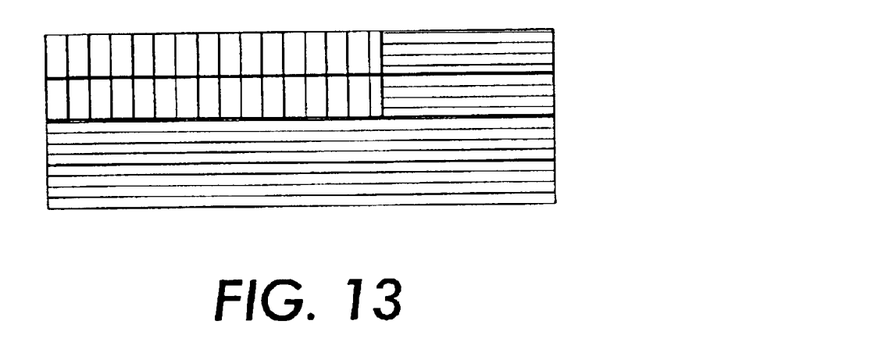
FIG. 13 shows the scanline buffer configuration for Example 2, where only constant color runs abut, and the trap radius is set to two.

We consider the case where the user specifies a trap radius of 2. Run-length encoded data consisting of constant color runs is sent to the trapping module for misregistration corrections. Since the trap radius is two, the input and output scanline buffers will collect four scanlines each. The set of scanlines under consideration in the scanline buffers is shown schematically in FIG. 13.

Figure 14:
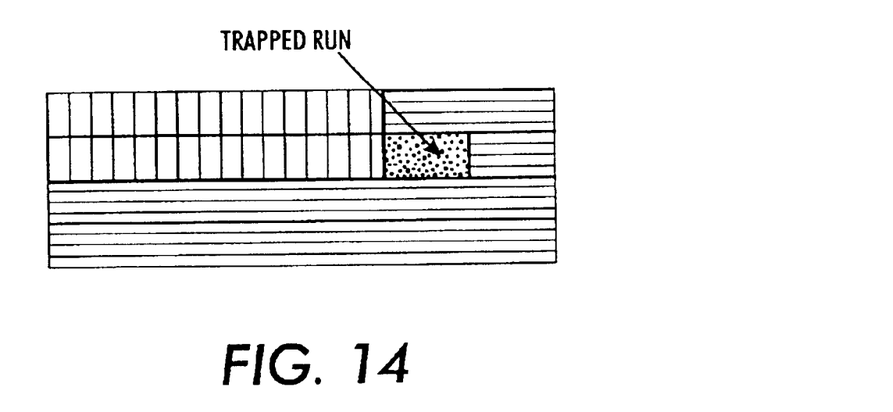
FIG. 14 shows the modification of the upper right run resulting from trapping in the fast direction.
Figure 15:
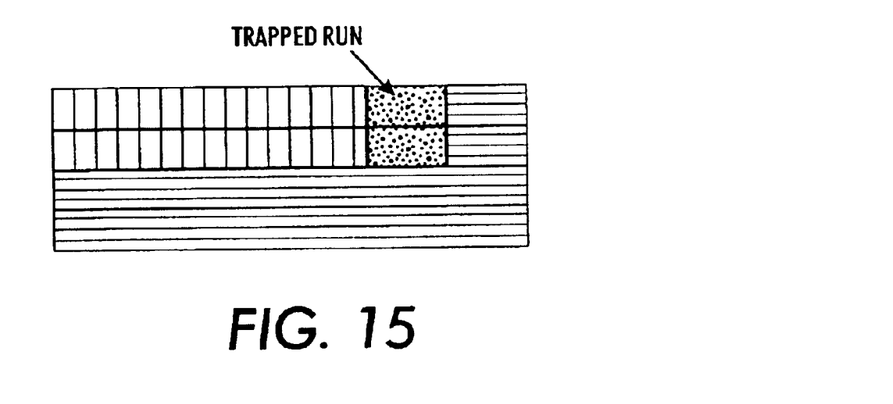
FIG. 15 shows the modification of the right run on the topmost scanline resulting from trapping in the fast direction.

Inspection of the input scanline buffer reveals that a segment boundary appears at the same fast position both on the first and second scanlines, at the intersection between the red and blue runs. The geometry will be determined by the run colors that appear at this segment boundary: upper left=red, upper right=blue, lower left=blue, lower right= blue. The geometry for this example would be a corner upper-left (since only the upper left corner is a different color), one of the 13 specified geometries from FIG. 3. Since the upper left and the upper right colors are different, the trap generator will be consulted. In this example, it is assumed the color returned by the trap generator is a gray tint, and the two pixel trap is to be placed on the right side of the run boundary (FIG. 14). For this case, the upper right (blue) run will be modified, such that it will begin two pixels further to the right of the segment boundary. A new run of constant color (length two pixels) will be inserted to the right of the segment boundary, and will carry the color returned by the trap generator. The algorithm will now look at the run immediately above the upper right run, on the first scanline. Since in this example the color of the upper right run is identical to the color immediately above, the rightmost run on the upper scanline will also be trapped in an identical fashion, as shown in FIG. 15.

Figure 16:
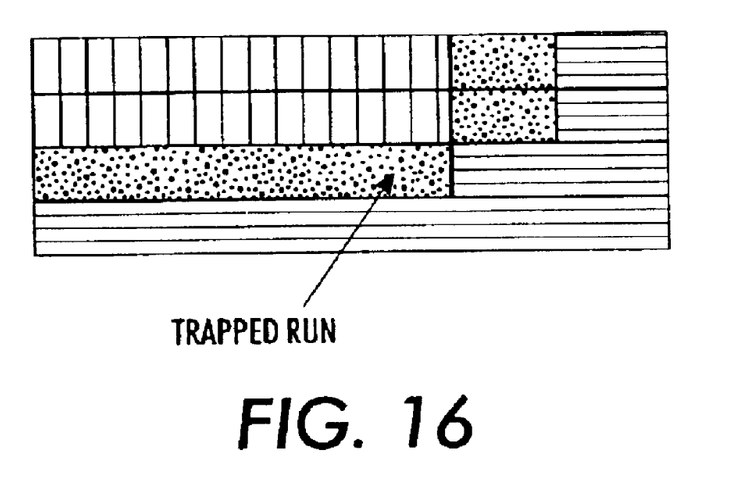
FIG. 16 shows the modification of the lower left run resulting from trapping in slow direction.
Figure 17:
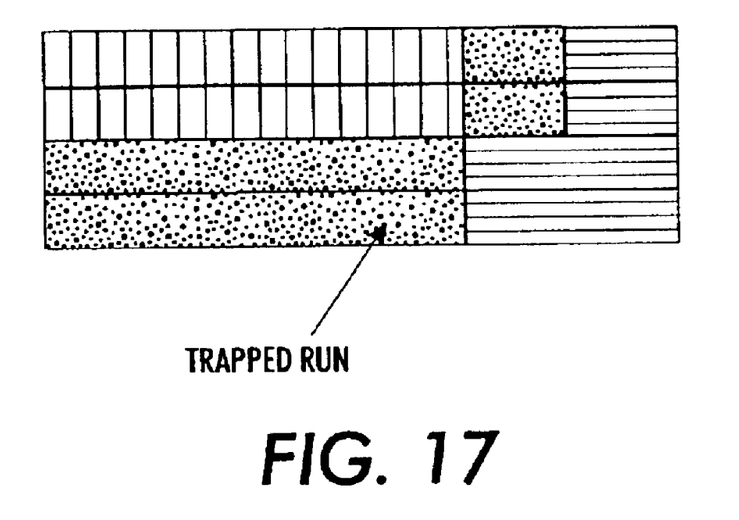
FIG. 17 shows the modification of the leftmost run of the bottom scanline resulting from trapping in slow direction. At this point the topmost scanline is emitted.

Although the upper left and lower left colors are also different, the trap generator need not be consulted again, as it has already been called for the red-blue color combination for fast scan direction trapping. Again here, the trapping will only be applied into the blue (lower left) run. The lower left run will then be split at the segment boundary into two separate runs, as shown in FIG. 16. The color of the left portion of the divided run will be set to the medium gray color returned by the trap generator. As was the case for the fast scan direction trapping, the run located on the last scanline immediately below the lower left run is inspected for a color match. In this example, the color of this run is also blue so that it will be trapped in the same fashion as the run directly above (FIG. 17).

Figure 18A:
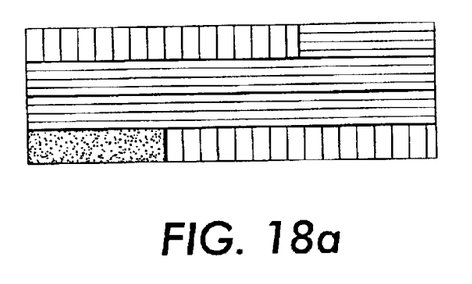
FIGS. 18a and 18b show the input and output scanline buffers, respectively after a new scanline is read.
Figure 18B:
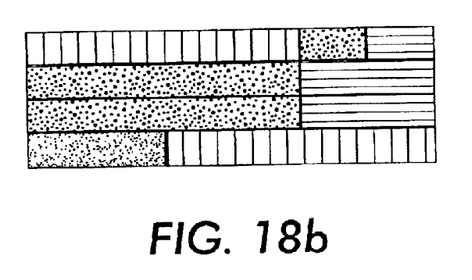

Since all segment boundaries of the scanline buffer have been analyzed, the topmost scanline is emitted (for example to the printer). The previous bottom scanline becomes the new top scanline, and the next scanline is read in for analysis, as shown in FIG. 18. The new segment boundaries are located for the scanline buffer, and the runs are trapped accordingly. This process is repeated until all scanlines of the image have been analyzed.

Example 3

Figure 19:
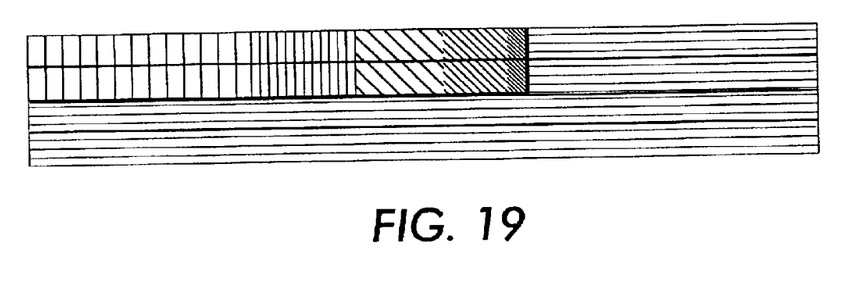
FIG. 19 shows the scanline buffer configuration for Example 3, where both constant color and smooth gradation (sweep) runs abut, and the trap radius is set to two.

We consider the case where the user specifies a trap radius of 2. Run-length encoded data consisting of constant color runs and smooth gradation runs (sweeps) is sent to the trapping module for misregistration corrections. Since the trap radius is two, the input and output scanline buffers will collect four scanlines each. The set of scanlines under consideration in the scanline buffers is shown schematically in FIG. 19.

Figure 20:
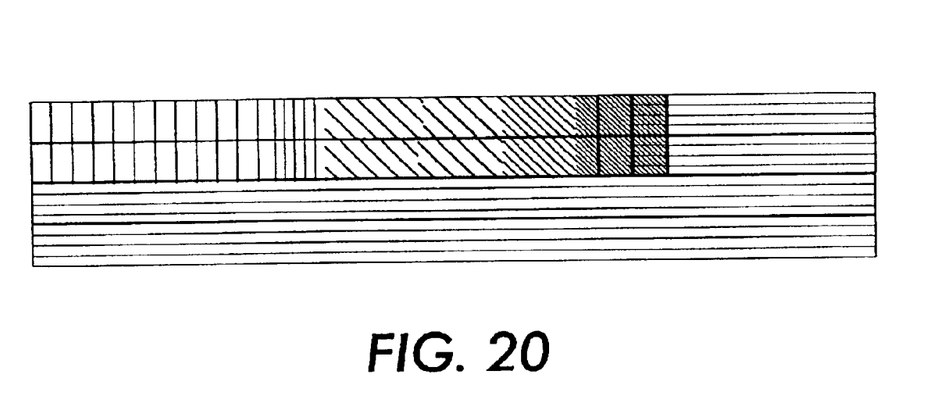
FIG. 20 shows the modification of the upper right run and the right run on the topmost scanline resulting from trapping in the fast direction.

Inspection of the input scanline buffer reveals that a segment boundary appears at the same fast position both on the first and second scanlines, at the intersection between the sweep and blue runs. The geometry will be determined by the run colors that appear at this segment boundary: upper left=red (the rightmost pixel value of the sweep in the second scanline), upper right=blue, lower left=blue, lower right=blue. The geometry for this example would be a corner upper-left (since only the upper left corner is a different color), one of the 13 specified geometries from FIG. 3. Since the upper left and the upper right colors are different, the trap generator will be consulted for trapping in the fast direction. In this example, it is assumed the color returned by the trap generator is a turquoise tint, and the two pixel trap is to be placed one pixel on the left and one pixel on the right of the run boundary (FIG. 20). For this case, the upper right (blue) run will be modified, such that it will begin one pixel further to the right of the segment boundary. A new run of constant color (length two pixels) will be inserted to the right of the segment boundary, and will carry the color returned by the trap generator. Likewise, the upper left run (sweep) will be reduced in length by one pixel, with a new single pixel run with the trap color inserted at its end. As in Example 2, the algorithm will now look at the runs immediately above the modified runs (located on the first scanline) and trap in an identical fashion (since both the sweep and blue extend upward one scanline).

Figure 21:
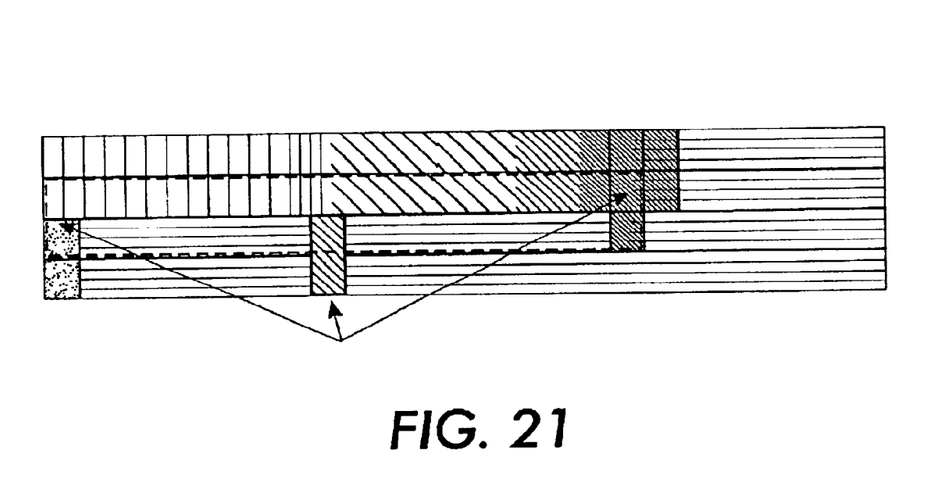
FIG. 21 shows the positions (min, center, and max) along the sweep/constant color interface for which the trap generator is consulted initially.

In the slow scan direction, the trap colors along the upper left (sweep) and lower left (constant color) runs first by consulting the trap generator for the left, center, and right color pairs along the interface, as shown in FIG. 21. The trap oracle will return a color and trap offset for each of the three color pairs. In this example, the trap offset values only match for the left and center color pairs. Therefore, the sweep is subdivided into two separate sweeps, and the process is repeated. However, the trap generator need only be consulted for the center color pair of the left sweep, and the left and center color pairs of the right sweep; for all other points the trap generator has already been consulted.

Figure 22:
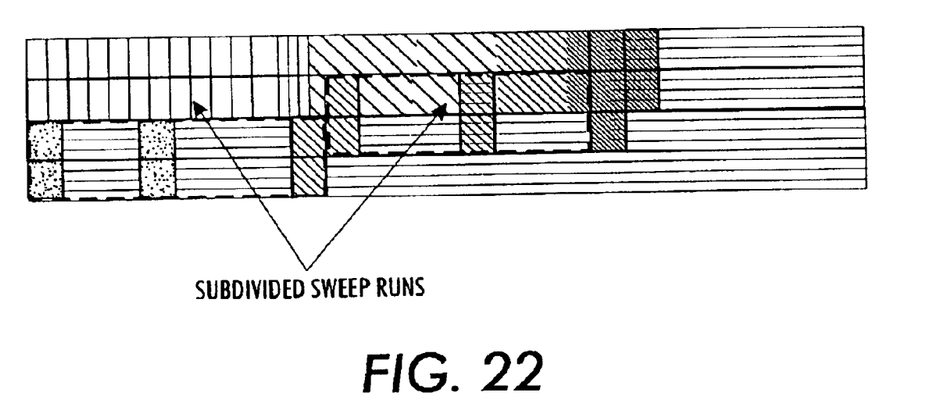
FIG. 22 shows the positions (min, center, and max) along the subdivided sweep/constant color interfaces for which the trap generator is consulted. In this case the trap offset values match within each subdivided run, so that interpolation may be performed to determine the intermediate pixel trap colors.
Figure 23:
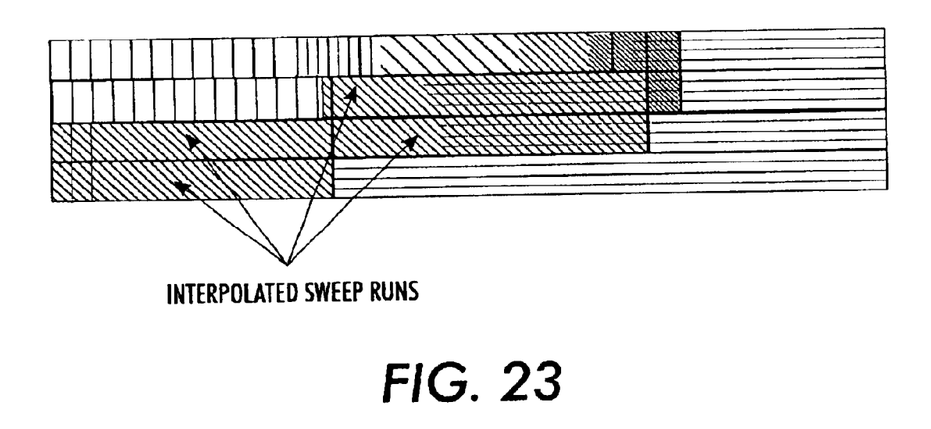
FIG. 23 shows the result of the interpolation procedure for sweep runs abutted against runs of constant color.

Once the sweeps are subdivided in this particular example, the offset values are found to match for the min, center, and max positions of each subdivided sweep (FIG. 22). At this point, interpolation is performed on each subdivided sweep run to determine the trap colors of the intermediate pixel positions (i.e. those positions for which the trap generator was not explicitly called). In this case simple quadratic interpolation is used. The result of such interpolation is schematically shown in FIG. 23.

As in the cases discussed in Examples 1 and 2, the topmost scanline is emitted upon processing of all segment boundaries within the current input scanline buffer. Scanlines 2, 3, and 4 are then shifted up in the buffer, and a new scanline is read into the lower position of the buffer. The trapping procedure described herein is repeated until all image information is processed.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of generating outputs for run length encoded constant color data which can be sent to a trap generator comprising the steps of:
    first determining the maximum number x of pixels which the trap generator may change in color,
    placing 2x scanlines in run length encoded form into a buffer,
    inspecting the run lengths in each scanline to determine the next run length end in any one of the 2x scan lines, and taking this end as the current end of segment for all scanlines,
    determining a center point at the intersection of the line between two scanlines and the line connecting the current end of all scanline segments, and determining a square of pixels all of which are adjacent the center point,
    determining the color of any two pixels in the square, and sending the number x and the colors of the two pixels to the trap generator to determine the trap color.

2. The method of claim 1 wherein the runs are of constant color.

3. The method of claim 1 wherein the color of all pixels adjacent the connecting line are sent to the trap generator.

4. A method of generating outputs for run length encoded color data which can be sent to a trap generator where at least one scanline contains uncorrelated image data comprising the steps of:

first determining the maximum number x of pixels in the slow scan direction which the trap generator may change in color, placing 2x scanlines in run length encoded form into a buffer, inspecting the run lengths in each scanline to determine the next run length end in any one of the 2x scan lines, and taking this end as the current end of segment for all scanlines, determining a center point at the intersection of the line between two scanlines and the line connecting the current and next pixels, and determining a square of pixels all of which are adjacent the center point, determining if a sampled image run exists in any of the four runs of this intersection, if so, determine the trap color along the interface of the sampled image run by calling the trap generator for each pixel within the sampled image run.

5. A method of generating outputs for run length encoded sweep data which can be sent to a trap generator comprising the steps of:

first determining the maximum number x of pixels in the slow scan direction which the trap generator may change in color, placing 2x scanlines in run length encoded form into a buffer, inspecting the run lengths in each scanline to determine the beginning and end of a on any one of the 2x scan lines, and taking these ends as the ends of the current segment for all scanlines, determining a center point at the intersection of the line between two scanlines and the line connecting the current and next pixels, and determining a square of pixels all of which are adjacent the center point, determining if a sweep run abuts a constant color run or another sweep run in the slow scan direction in any of the four corners of this intersection, if so, for a the first, middle, and last pixels within the sweep, determine their trap colors by calling the trap generator for each, and determining the trap colors of the intermediate pixels via interpolation.

* * * * *